Jan. 27, 1942.   D. L. DE WITT   2,271,254
THERMOMETER
Filed Aug. 5, 1940   2 Sheets-Sheet 1
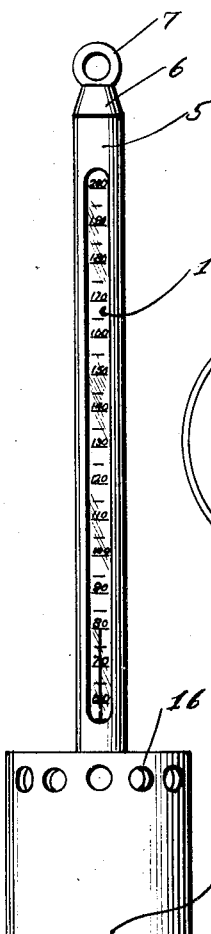
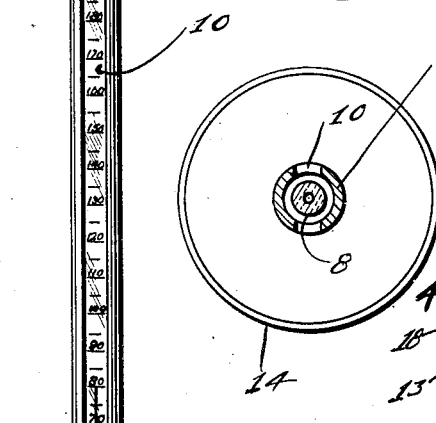
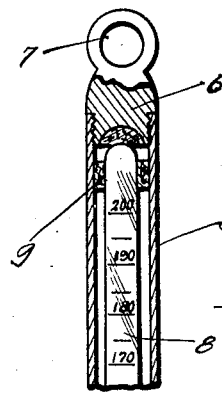
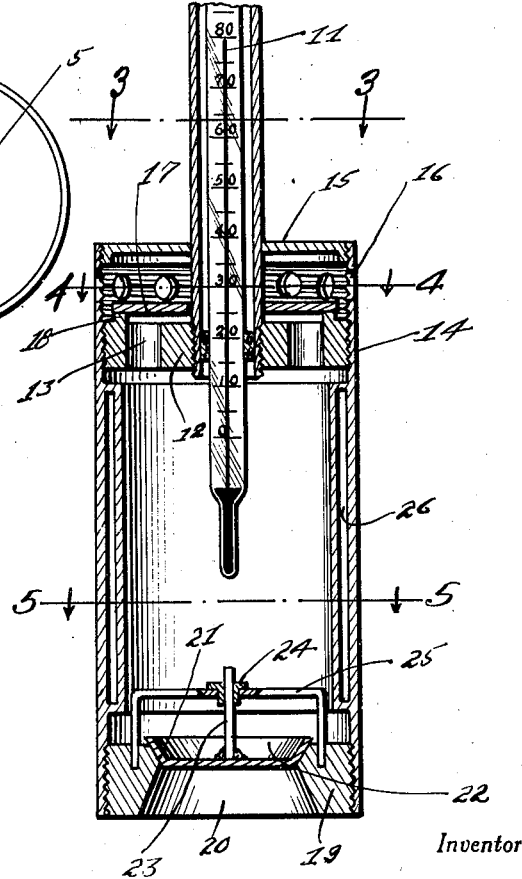
Inventor
David L. DeWitt
By *Clarence A. O'Brien*
Attorney Jan. 27, 1942.  D. L. DE WITT  2,271,254
THERMOMETER
Filed Aug. 5, 1940   2 Sheets-Sheet 2

Inventor
David L. DeWitt

By Clarence A. O'Brien

Attorney

Patented Jan. 27, 1942

2,271,254

UNITED STATES PATENT OFFICE 2,271,254

THERMOMETER

David L. DeWitt, Baytown, Tex.

Application August 5, 1940, Serial No. 351,519

2 Claims. (Cl. 73—354)

The present invention relates to new and useful improvements in thermometers adapted for indicating the temperature of liquids in tanks, reservoirs, wells and for other purposes, and has for its primary object to provide a holder for the thermometer adapted to receive a quantity of the liquid at any predetermined point at which the holder may be suspended in the tank or reservoir, in order that the temperature of the liquid at a desired point of submersion may be accurately ascertained.

A further important object of the present invention is to provide a thermometer holder adapted to receive a sample of the liquid at a predetermined depth for indicating the temperature of the liquid at such depth and for maintaining the thermometer in such sample of the liquid during the removal of the holder from the liquid.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view,

Figure 2 is a vertical sectional view,

Figure 4:
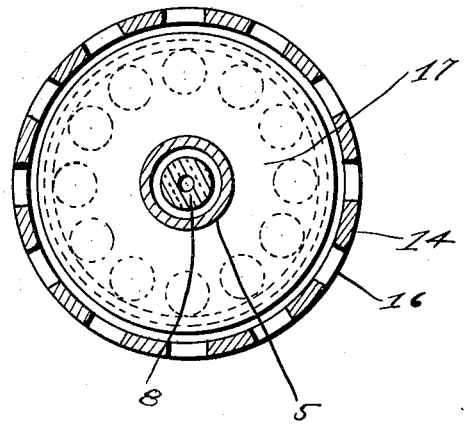
Figure 5:
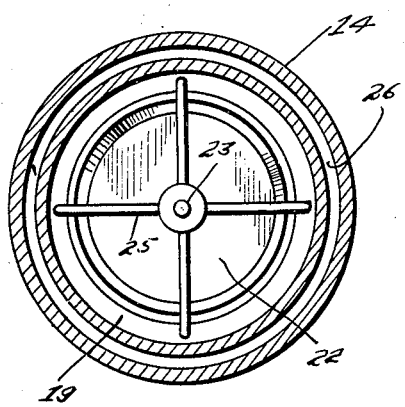
Figure 6:
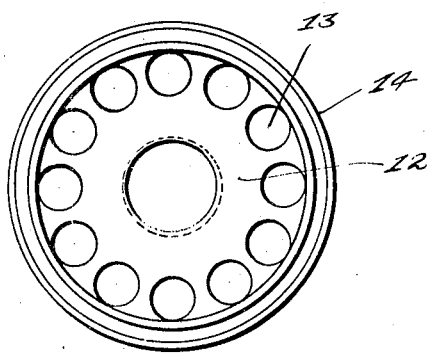
Figure 7:
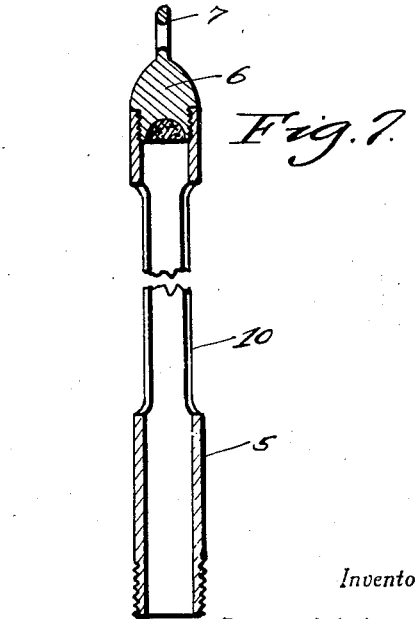

Figures 3, 4, and 5 are transverse sectional views taken respectively on the lines 3—3, 4—4 and 5—5 of Figure 2, Figure 6 is a plan view with the tube for the thermometer and upper valve removed, and Figure 7 is a vertical sectional view through the thermometer shield.

Referring now to the drawings in detail, wherein for the purpose of illustration I have disclosed a preferred embodiment of the invention, the numeral 5 designates a tubular thermometer shield which is open at each end and provided with a threaded plug 6 at its upper end having an eye 7 to which a line may be attached, the shield being adapted to enclose the thermometer tube 8 with the lower end of the thermometer projecting downwardly through the lower end of the shield. The thermometer is maintained in spaced relation from the shield by means of packing members 9, the lowermost of said packing members forming a liquid-tight fit between the thermometer and the walls of the shield. The shield is provided with longitudinally extending slotted openings 10 to permit a reading of the mercury 11 in the thermometer tube.

The lower end of the shield 5 is threaded in a perforated plug 12 having the passages 13 formed therein, the plug being threaded in the internally threaded upper end of a cylindrical casing 14 and the shield 5 is centered in the casing by means of a cap 15 which is threaded in the upper end of the casing. The side walls of the casing between the plug 12 and the cap 15 are provided with openings 16 and arranged in the upper portion of the casing between the plug 12 and the cap 15 is a valve member 17 of disk form slidably mounted on the lower end of the shield 5 and adapted to seat on the upwardly projecting flange 18 formed on the upper edge of the plug 12 outwardly of the openings 13 therein, as clearly shown in Figure 2 of the drawings.

In the lower end of the casing 14 is a plug 19 having a central opening 20, the inner edge of said opening being tapered to provide a valve seat 21 for a conical valve 22, the valve having a guide stem 23 slidably mounted in a plug 24 secured in a spider 25 extending inwardly from the plug 19.

The intermediate portion of the casing 14 is provided with spaced walls to provide a dead air chamber 26 to form an insulation for the casing.

In the operation of the device the eye 7 is attached to a cable or line for dropping the device into the liquid of a well, tank, or other reservoir, the valves 17 and 22 being gravity actuated for closing and adapted for opening movement by the liquid entering the opening 20 during the downward movement of the device. When the device has been lowered to a predetermined level the valves will close and a quantity of the liquid at such level will be trapped in the casing and will remain therein during the raising of the device to a position where the thermometer can be inspected and thus a positive temperature reading of the contents of the tank, well, or the like at any predetermined level may be obtained.

It is believed the details of construction, operation and manner of use of the device will be readily undertsood from the foregoing without further detailed explanation.

What I claim is:

1. A thermometer holder comprising a liquid trap including a tubular body adapted to be lowered endwise into a liquid tank or the like, an inwardly opening valve in the bottom of said body for admitting liquid into said body when the same is lowered into the tank, a cap closing the upper end of the body, a perforated plug threaded into the upper end of the body and spaced below said cap to form therewith a valve chamber in the upper end of the body into which the liquid in said body may rise through said plug, circumferential ports in said body leading from said chamber for the escape of liquid therefrom, said plug having an annular flange on top thereof forming a valve seat surrounding said perforations, a tubular thermometer casing upstanding from said body in the axis thereof and extending through said cap, chamber and plug into the space below the latter, said casing having a thermometer therein extending therefrom into said space, and a gravity actuated valve in said chamber for seating on said seat to close said perforations in the plug, said valve comprising an annular disc slidably mounted on the casing for upward opening movement under the pressure of liquid rising through the plug.

2. A thermometer holder comprising a liquid trap including a tubular body adapted to be lowered endwise into a liquid tank or the like, an inwardly opening valve in the bottom of said body for admitting liquid into said body when the same is lowered into the tank, a cap closing the upper end of the body, a perforated plug threaded into the upper end of the body and spaced below said cap to form therewith a valve chamber in the upper end of the body into which the liquid in said body may rise through said plug, circumferential ports in said body leading from said chamber for the escape of liquid therefrom, said plug having an annular flange on top thereof forming a valve seat surrounding said perforations, a tubular thermometer casing upstanding from said body in the axis thereof and extending through said cap, chamber and plug into the space below the latter, said casing having a thermometer therein extending therefrom into said space, and a gravity actuated valve in said chamber for seating on said seat to close said perforations in the plug, said valve comprising an annular disc slidably mounted on the casing for upward opening movement under the pressure of liquid rising through the plug, said body intermediate the first-mentioned valve and said plug being provided with spaced walls to form a dead air insulation space around the body.

DAVID L. DE WITT.